US010672402B2

(12) United States Patent
De et al.

(10) Patent No.: US 10,672,402 B2
(45) Date of Patent: Jun. 2, 2020

(54) SPEECH WITH CONTEXT AUTHENTICATOR

(71) Applicant: INTERNATIONAL BUSINESS MACHINES CORPORATION, Armonk, NY (US)

(72) Inventors: Jayshree De, Kolkata (IN); Arghya Mitra, Kolkata (IN); Santanu Mukherjee, Kolkata (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 22 days.

(21) Appl. No.: 15/484,249

(22) Filed: Apr. 11, 2017

(65) Prior Publication Data

US 2018/0293989 A1 Oct. 11, 2018

(51) Int. Cl.

| | |
|---|---|
| ***G10L 17/22*** | (2013.01) |
| *G10L 25/63* | (2013.01) |
| *G10L 15/22* | (2006.01) |
| *G10L 17/24* | (2013.01) |

(52) U.S. Cl.
CPC .............. *G10L 17/22* (2013.01); *G10L 15/22* (2013.01); *G10L 17/24* (2013.01); *G10L 25/63* (2013.01)

(58) Field of Classification Search
CPC .......... G10L 17/22; G10L 17/24; G10L 15/22
See application file for complete search history.

(56) References Cited

U.S. PATENT DOCUMENTS

| | | | | |
|---|---|---|---|---|
| 6,850,147 | B2 | 2/2005 | Prokoski et al. | |
| 8,145,562 | B2 | 3/2012 | Wasserblat et al. | |
| 9,047,866 | B2 * | 6/2015 | Koval | G10L 17/02 |
| 9,118,669 | B2 | 8/2015 | Moganti et al. | |
| 2002/0152078 | A1 * | 10/2002 | Yuschik | G10L 17/14 704/273 |
| 2003/0028384 | A1 * | 2/2003 | Kemp | G10L 17/26 704/275 |
| 2010/0158207 | A1 * | 6/2010 | Dhawan | G10L 17/22 379/88.02 |
| 2012/0281885 | A1 * | 11/2012 | Syrdal | G06F 21/32 382/116 |

(Continued)

FOREIGN PATENT DOCUMENTS

| | | | | |
|---|---|---|---|---|
| EP | 2712454 A1 * | 4/2014 | | A61B 5/117 |
| WO | WO2006076347 A2 | 7/2006 | | |

OTHER PUBLICATIONS

Peter Mell et al, The NIST Definition of Cloud Computing, National Institute of Standards and Technology, Publication 800-145, 2011.

(Continued)

*Primary Examiner* — Feng-Tzer Tzeng
(74) *Attorney, Agent, or Firm* — Patrick J. Daugherty; Daugherty & Del Zoppo Co., LPA

(57) ABSTRACT

A computer-implemented method for authenticating speech includes executing on a computer processor the step of receiving speech and context for the speech of a speaker, wherein the speech is received as electronic voice communication, wherein the context for the speech includes biometric information measured during the received speech. The speaker is authenticated according the received speech and the context by a speech with context model. A result of the authentication is returned.

14 Claims, 5 Drawing Sheets

130 12 136 138 50 134
Contextual speech authenticator
Speech with biometrics models
Social Relation
132 authentication result
114 154W
GPS Comm. 112
Display/ Haptic/Audio 118
Microphone 116
Biometric Sensor 110
120 context speech 102
authentication result 132
speech 102
speech 102
154B
104
54A
154W
100
154B
154X
106

(56) References Cited

U.S. PATENT DOCUMENTS

| | | | | |
|---|---|---|---|---|
| 2013/0305171 | A1* | 11/2013 | Torgersrud ............ | G06Q 50/01 715/762 |
| 2014/0289833 | A1 | 9/2014 | Briceno et al. | |
| 2015/0039299 | A1* | 2/2015 | Weinstein ............... | G10L 15/16 704/202 |
| 2016/0118050 | A1 | 4/2016 | Arslan | |

OTHER PUBLICATIONS

Tractica, Biometrics Market Revenue to Total $67 Billion Worldwide over the Next 10 Years, https://www.tractica.com/newsroom/press-releases, 2015.
Voicevault, Biometrics: The Future of Authentication in the Banking Industry, http://voicevault.com/biometrics, 2015.
Industrial Revolutions, CNBC, Biometrics and mobiles: Banking's future?, http://www.cnbc.com/2014/06/10.
Hilal Bakanay, The Future of Secure Mobile Banking: Voice Biometrics, Sestek, http://www.sestak.com/2016/04.
Wikipedia, Speech repetition, https://en.wikipedia.org/wiki/Speech_repetition, 2017.
Brian Heater Tech Times, According to Alcatel OneTouch's Go Emotion-Detecting Smartwatch, I Am Going Crazy, hittp://www.techtimes.com/articles, 2015.
Iona Tan, New Smartwatch Measures Emotions, http://www.icare4autism.org/news, 2015.
Emopulse, emopulse.com, this website is for sale! —emopulse Resources and Information, http://www.emopulse.com, 2017.

* cited by examiner

SPEECH WITH CONTEXT AUTHENTICATOR

BACKGROUND

Electronic speech recognition can include voice recognition or speaker identification, which is used for authentication of a person speaking. That is, with speech recognition, the identity of a person is revealed through voice of the person speaking. For example, analysis of the speech transmitted over a phone call can reveal or confirm the identity of the person according to their transmitted voice.

Speech authentication is a process of showing that the identity of the person is valid according to the speech or voice of the person. Speech authentication seeks to minimize false positives, such as authenticating speech of a person who is not actually the person, and false negatives, such as not authenticating speech of a person who is actually the person.

Speech with practice can be copied with regard to accent, intonation, pitch, and even individualized, which can increase false positives. For example, entertainment impersonators have demonstrated the ability to mimic the speech of other persons.

Conversely, speech for an individual can vary. For example, a spoken pattern can vary in speed, timbre, pitch, loudness and emotion.

BRIEF SUMMARY

In one aspect of the present invention, a computer-implemented method for authenticating speech includes executing on a computer processor the step of receiving speech and context for the speech of a speaker, wherein the speech is received as electronic voice communication, wherein the context for the speech comprises biometric information measured during the received speech. The speaker is authenticated according the received speech and the context by a speech with context model. A result of the authentication is returned.

In another aspect, a system for authenticating speech has a hardware processor, computer readable memory in circuit communication with the processor, and a computer-readable storage medium in circuit communication with the processor and having program instructions stored thereon. The processor executes the program instructions stored on the computer-readable storage medium via the computer readable memory and thereby receive speech and context for the speech of a speaker, wherein the speech is received as electronic voice communication, wherein the context for the speech comprises biometric information measured during the received speech. The speaker is authenticated according the received speech and the context by a speech with context model. A result of the authentication is returned.

In another aspect, a computer program product for authenticating speech has a computer-readable storage medium with computer readable program code embodied therewith. The computer readable hardware medium is not a transitory signal per se. The computer readable program code includes instructions for execution by a processor that cause the processor to receive speech and context for the speech of a speaker, wherein the speech is received as electronic voice communication, wherein the context for the speech comprises biometric information measured during the received speech. The speaker is authenticated according the received speech and the context by a speech with context model. A result of the authentication is returned.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
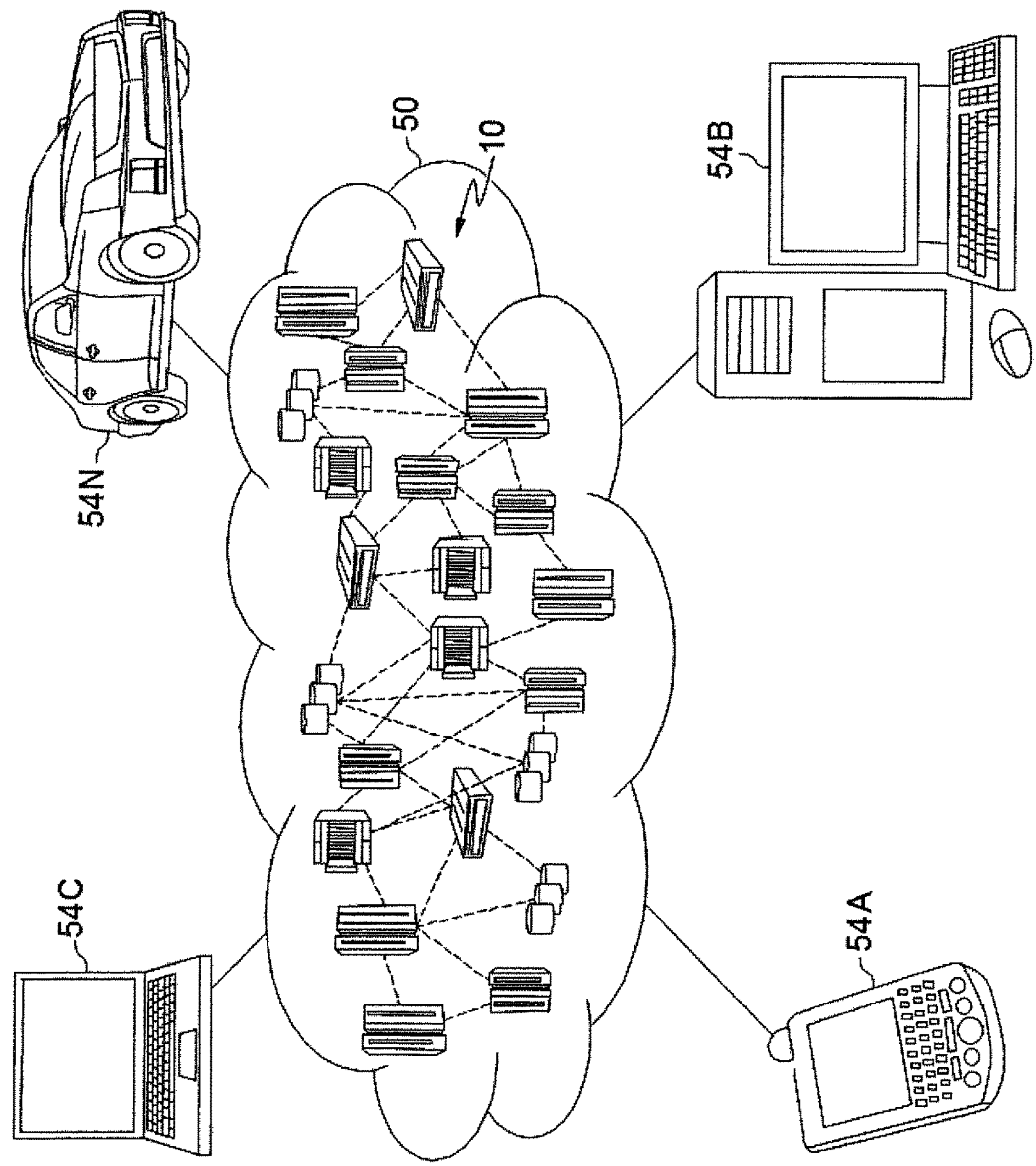
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
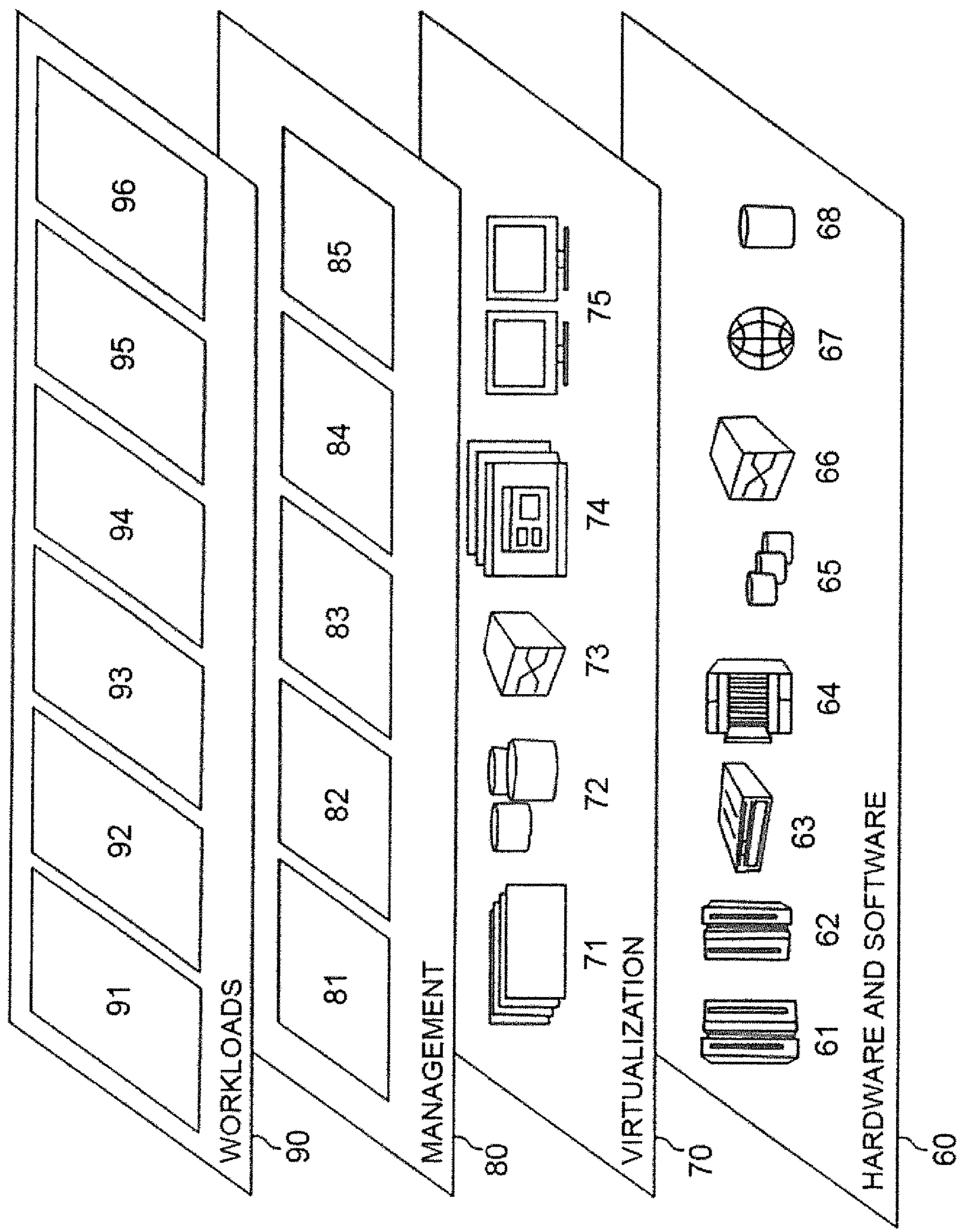
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and authenticating speech 96.

Figure 3:
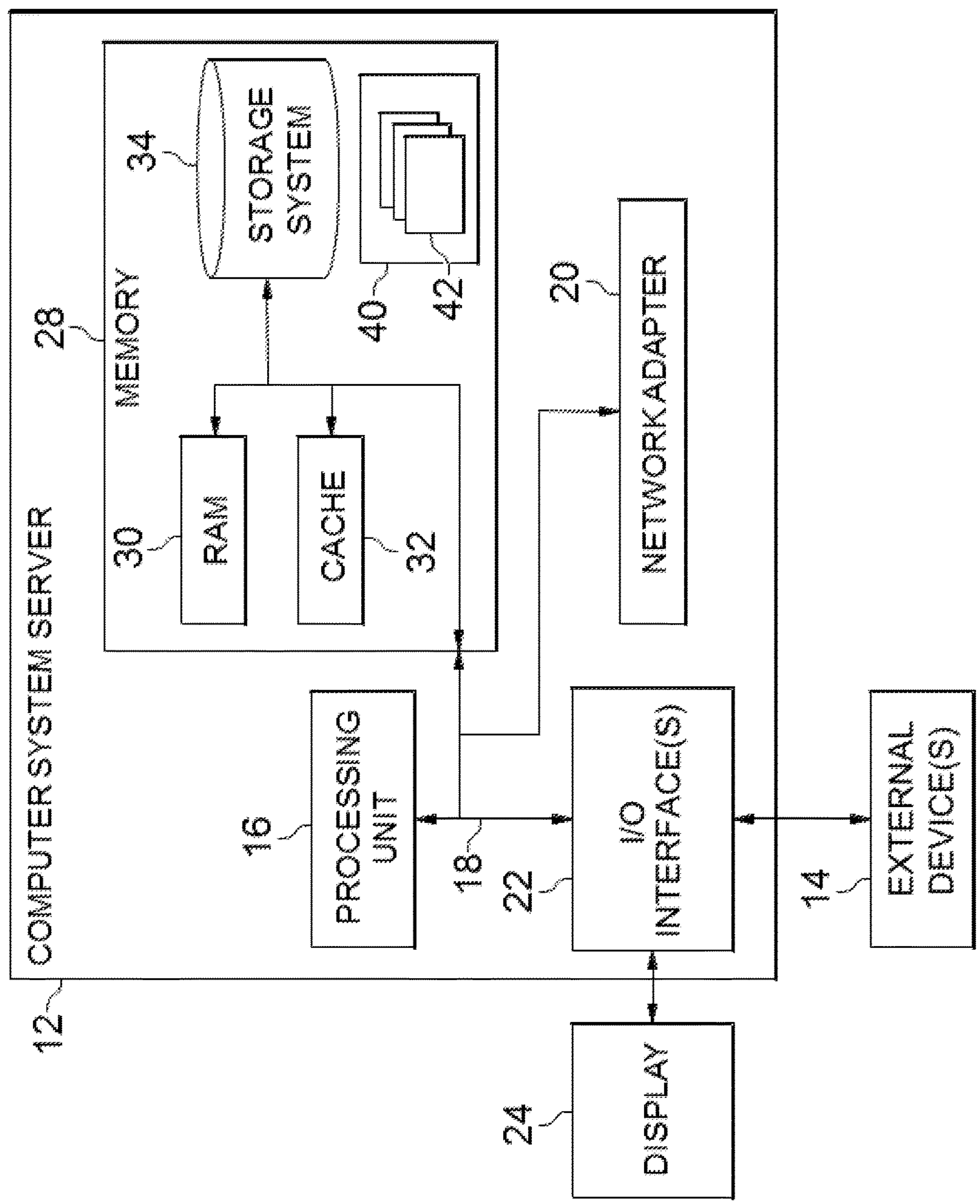
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
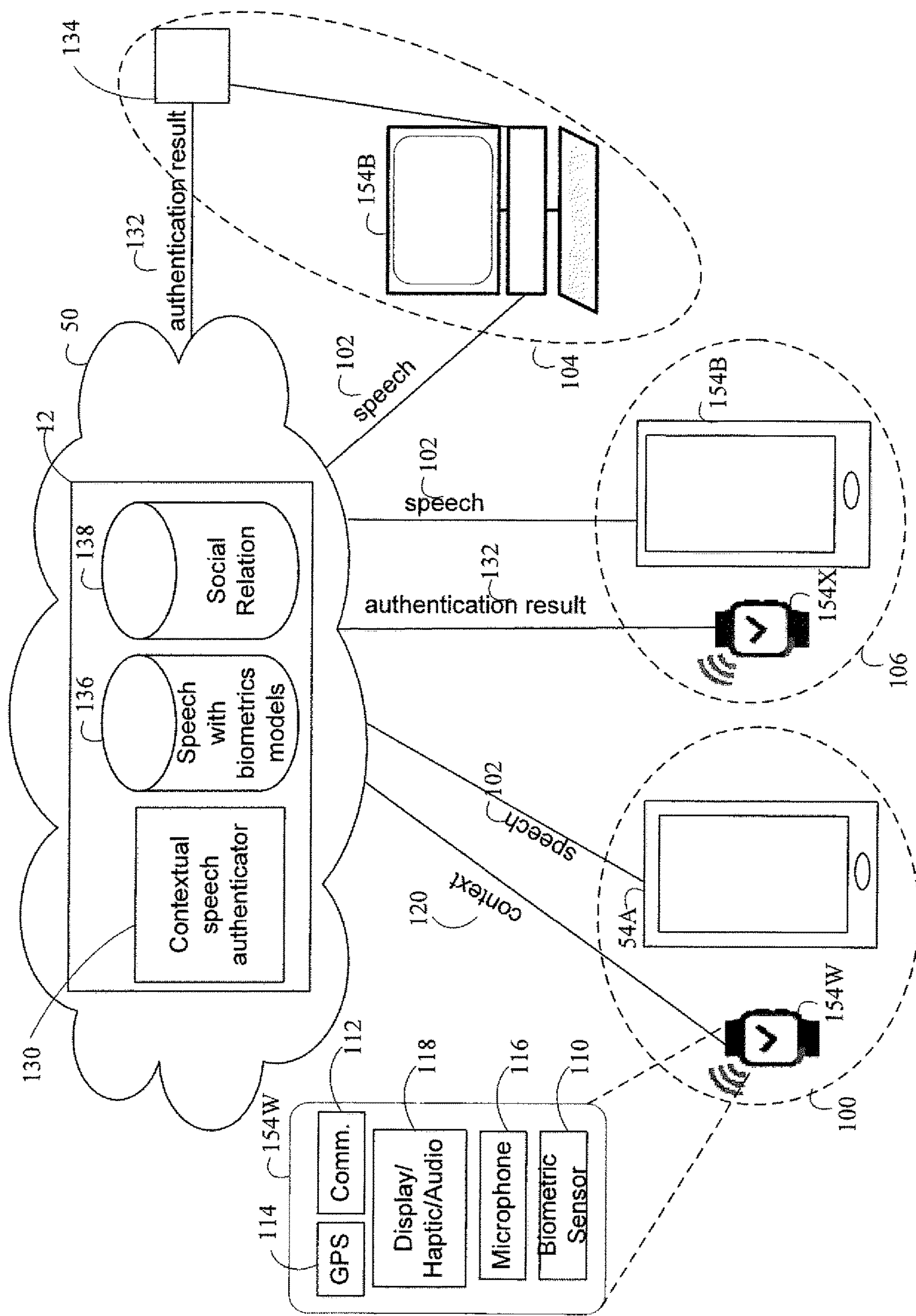
FIG. 4 depicts a schematic illustration of system aspects according to an embodiment of the present invention

FIG. 4 illustrates schematically a system according to the present invention for authenticating speech. The local computing device 54, such as a first cellular phone 154A communicates speech 102 of a first user 100 to the local computing device 54, such as desktop computer 154B of a second user 104 or to the local computing device 54, of a third user 106, such as a second cellular phone 154X.

The first user 100 wears a smartwatch 154W, which includes a biometric sensor 110, such as a pulse oximeter, illustrated in an exploded view of the smartwatch 154W. The biometric sensor 110 senses physiological signals, such as temperature, heart rate (HR) and blood pressure (BP), and generates a value indicative of an emotion.

The smartwatch 154W includes a transceiver 112, which communicates a context 120 that includes the emotion. In some embodiments, the communicated emotion includes the sensed physiological signals, a classification of the emotion, or the value indicative of the emotion. In some embodiments, the physiological signals can include indicators of health condition, which can vary the speech 102. The transceiver 112 is configured to communicate the context 120 using near field communications (NFC), wireless communications, cellular communications and/or the like.

In some embodiments, the smartwatch receives communications from nearby local computing devices 54, and identities of the nearby local computing devices from the received communications. The identities and/or corresponding users of the nearby local computing devices can be included in the communicated context 120. For example, the presence of different persons according to the nearby local computing devices, such as managers, co-workers, friends, or family is determined, whose presence alters the speech 102 because of a different social context or evoked emotion.

The smartwatch 154W can include a global positioning system (GPS) unit 114 configured to determine a position of the smartwatch 154W. In some embodiments, the context 120 includes the position determined by the GPS unit 114.

For example, a locational context can include indicators of an office, a public space, or a home, where the location alters the speech 102.

The smartwatch 154W can include a microphone 116 configured to receive background or environmental noise, which can be included in the context 120. For example, street noise, speech of other nearby persons can be included in the communicated context 120 as environmental context. The background or environmental noise can include indicators of attention to the speech 102. For example, conversational noise directing attention to other information can vary the speech 102, such as attention to a display screen on a different topic, The smartwatch 154W includes a display device 118 configured to display messages, alerts, and/or the like. In some embodiments, the smartwatch 154W includes a haptic device and/or audio device. The haptic unit and/or audio unit can provide alternative or enhanced communication to the first user separately or in combination with the display device, such as vibration and/or sound indicative of the message, alert and the like.

A contextual speech authenticator 130 receives the speech 102 and the context 120 and authenticates the first user 100 using the speech 102 and the context 120. The contextual speech authenticator 130 returns an authentication result 132. The authentication in real-time can be transactional or continual. For example, with the first user 100 to authorize a bank transaction with the second user 104 as a bank representative, the speech authorizing the transaction can be authenticated and the authentication result 132 returned to a server 134 of the bank. In another example, the first user 100 communicates to the third user 106 and authentication is continually sent for the duration of the conversation to a second smartwatch 154X of the third user 106.

The contextual speech authenticator 130 authenticates the speech 102 using the speech 102 and the context 120 according to a speech with context model 136. The speech with context model 136 can include a pattern matching model and/or a machine learning model, such as a deep learning model, support vector machines, regression analysis, statistical classification, frequency estimation, hidden Markov models, Gaussian mixture models, pattern matching algorithms, neural networks, matrix representation, vector quantization and decision trees, or combinations thereof, and the like.

In some embodiments, the contextual speech authenticator 130 matches both the speech 102 and the context 120. For example, speech of the first user 100 experiencing an emotion A according to the context 120 is matched to previous speech of the first user 100 recorded when the first user 100 is experiencing the emotion A or previous speech of the first user 100 when the first user 100 was experience the emotion A used to the train the speech with context model 136. If the speech experiencing the emotion A matches the stored speech of emotion A, then the identity of the speaker is authenticated, otherwise the speaker is not authenticated. In some embodiments, not authenticating the speaker returns a null result.

In some embodiments, the contextual speech authenticator 130 using the speech with context model 136, compares the speech 102 with previous speech for the user and identifies the emotion according to the speech 102. The identified emotion from the speech 102 is then compared with the emotion from the context 120. If the emotions and the speech match, then the identity of the speaker is authenticated, otherwise the speaker is not authenticated. For example, the contextual speech authenticator 130 compares the speech 102 with previous speech for the user and identifies an emotion classified as happiness. The contextual speech authenticator 130 then compares the identified emotion classified as happiness with the emotion from the context 120. If the emotion from the context 120 is matched as happiness, then the speaker is authenticated, otherwise, the speaker is not authenticated.

In some embodiments, other factors from the context 120 can be used to further refine the speech with context model 136. For example, using GPS to establish geographical context, speech can vary by location, such as between a context of an office and a context of a home. In another example, using context of identities of nearby local computing devices and/or speech in background noise, speech can vary according to context of others present, such as in the presence of co-workers, managers, family, and/or friends.

An advantage over conventional practice of speech only authentication is additional factors, such as the emotion measured independently of speech by the smartwatch 154W and included in the context 120. This provides a two factor authentication of speech and emotion.

In some embodiments, the authentication result 132 is limited to an identity of the speaker. For example, X is the identity of the first user 100, which is displayed on the display device 118 of the third user 106 while the two users are communicating in a transaction or continually. The example can be reciprocal or bidirectional. That is, while the authentication of X is displayed on the display device 118 of the second smartwatch 154X of the third user 106, the authentication of Y as the identity of the third user 106 is displayed on the display device 118 of the first smartwatch 154W of the first user 100.

In some embodiments, the contextual speech authenticator 130 includes additional information in the returned authentication result 132, such as the identified emotion. The contextual speech authenticator 130 includes the additional information according to a social relationship 138 or bond between authenticated speakers. The social relationship can include permissions according to the additional information. For example, with social relationships such as family and friends, the emotion is included in the returned authentication result 132 and is displayed on the display device 118 of the corresponding smartwatch.

The contextual speech authenticator 130, the speech with context 136 can be integrated into a node 10, such as the computer system/server 12. In some instances, the contextual speech authenticator 130 minimizes false positives and false negatives by using both the speech 102 of a speaker and the context 120 in which the speech 102 is provided according to a local computing device 54, such as a smartwatch. The smartwatch can separately measure and provide biometrics or emotions of the speaker, locational context, presence of other individuals, and combinations thereof during the speech 102 for additional authentication factors.

Figure 5:
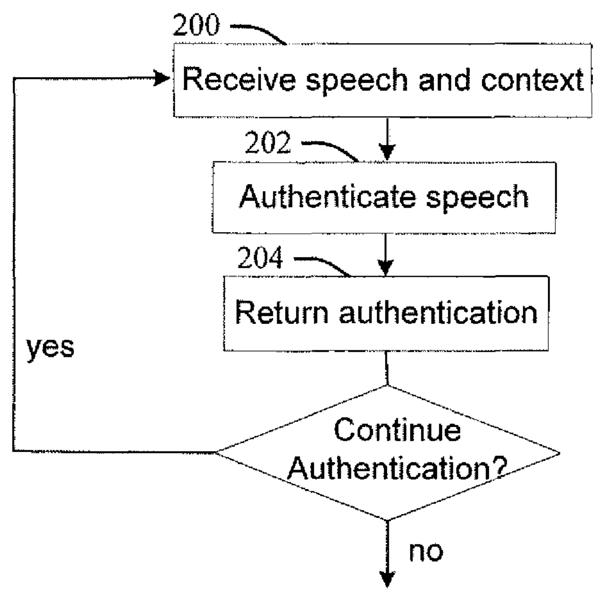
FIG. 5 is a flow chart illustration of an embodiment of the present invention.

FIG. 5 illustrates one embodiment of a method according to the present invention for authenticating speech. At 200, a processor that is configured according to an aspect of the present invention (the "configured processor"), receives speech 102 and context 120 of the speech. The speech 102 is received from the local computing device 54, such as the personal digital assistant (PDA) or cellular telephone 54A, configured for voice communications. In some embodiments, the speech 102 can be received from the node 10 that carries or manages the voice communications from the local computing device 54. The context 120 includes biometrics, such as the identified emotion or physiological signals that comprise the emotion according to the local computing device 54, such as the smartwatch 154W, 154X.

The context 120 can include locational context, such as a GPS location, or the physical location according to the GPS 114. For example, the GPS location can identify a public place, such as an office, street, or restaurant, or a private place, such as a home. The context 120 can include environmental context, such as background noise or other speech according to the microphone 116. For example, the environmental context can include a level of sounds, or specific sounds, such as street sounds, motor traffic, and the like. The context 120 can include social context, such as other persons nearby according to other corresponding local computing devices identified by the transceiver 112. For example, the social context can include the corresponding identities of friends, family, co-workers, supervisors, and the like. The context 120 can include a health condition, such as according to measured physiological signals.

The received speech 102 and context 120 can be transactional for a discrete period in voice communications. For example, in a bank transaction, before initiating authentication of speech authorizing a transaction, a user performs an exercise which alters physiological parameters and in turn speech. The transaction is only authenticated if both the speech 102 and context 120 match after the exercise. The received speech 102 and context 120 can be continuously received for the duration of the voice communication or conversation. For example, the received speech 102 and context 120 are continuously sampled over the length of the conversational. The samples can be in variable intervals, such as starting when the speaker is speaking and ending when the speaker pauses or the other speaker begins, or in fixed time intervals.

At 202, the configured processor authenticates the speaker according to the received speech 102 and context 120 using the speech with context model 136. The authentication result 132 is returned. If the speech 102 and context 120 match previous speech classified according to context, then the speaker is authenticated, otherwise the speaker is not authenticated.

At 204, the configured processor returns the authentication result 132. The authentication result 132 can include the identity of the authenticated speaker or an indicator that the speaker is authenticated, such as a message "authenticated" or a message of the speaker's identity displayed on the display device 118 of the smartwatch 154X, sounding an audible tone on the smartwatch 154X, a vibration pattern performed by the smartwatch 154X, combinations thereof and the like. The authentication result 132 can include a different message, such as "no authentication," or "authentication denied" displayed on the display device 118 of the smartwatch 154X, sounding a different audible tone, a different vibration pattern, combinations thereof and the like.

At 206, the configured processor decides whether to continue authentication. For example, in a continuous mode, sampling in intervals, the configured processor can repeats acts 200-204 for each interval. The method can end when voice communication terminates. In some embodiments, the configured processor can continue authentication for a fixed number of iterations of acts 200-204 where the authentication result 132 indicates no authentication result. That is, authentication is retried as fixed number of iterations before ending. The authentication result 132 can be different according to the number of iterations. For example, the message can include a number of retries remaining or a number of attempts performed.

Figure 6:
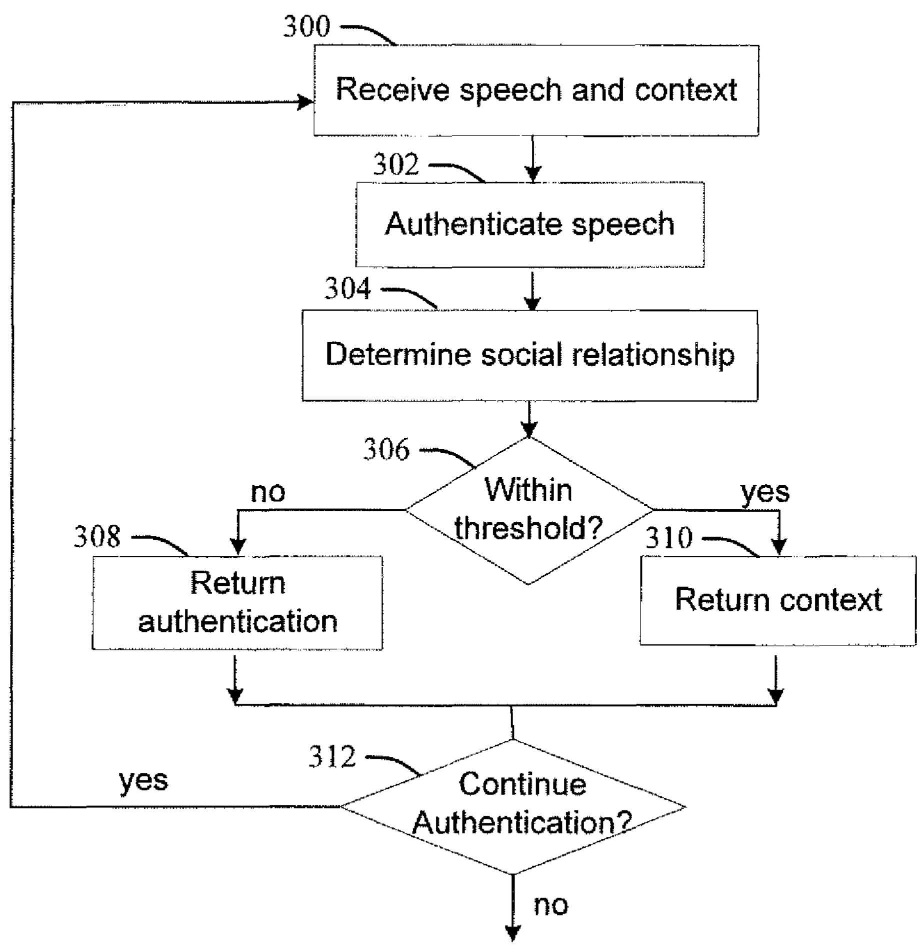
FIG. 6 is a flow chart illustration of another embodiment of the present invention.

FIG. 6 illustrates another embodiment of a method according to the present invention for authenticating speech. At 300, a processor that is configured according to an aspect of the present invention (the "configured processor"), receives speech 102 and context 120 of the speech for each local computing device 54 participating in a voice communication. In some embodiments, the speech 102 can be received from the node 10 that carries or manages the voice communications. The context 120 includes biometrics from a corresponding smartwatch of each local computing device 54 participating in the voice communications.

The context 120 can include locational context, environmental context, a health condition, social context, combinations thereof and the like. The received speech 102 and context 120 can be transactional for a discrete period in voice communications or repeated for variable or fixed intervals.

At 302, the configured processor authenticates the speaker for each local computing device 54 according to the received speech 102 and context 120 corresponding to the speaker. For example, in a two party conversation between a speaker X and a speaker Y, speaker X is authenticated according to the speech and context of X, and speaker Y is authenticated according to the speech and context of Y. The context 120 of each speaker can include social context of the other speakers.

At 304, the configured processor determines a social relationship between authenticated speakers. The social relationship can be represented as a group relationship. That is, if the authenticated speakers are members of a same group, such as family, friends, and the like, a value associated with the group membership can be determined. The group membership can be determined formally by permissions and/or by empirical usage, such as repeated grants of permission to allow information from the context 120 to be shared. Groups can be separate or include other groups, each with a corresponding value. That is, groups can be distinct or nested. For example, members of a family group can be nested or considered as a subset of members of a friends group or membership between the two groups can be distinct.

At 306, the configured processor decides whether the determined social relationship exceeds a threshold indicative of sharing additional information from the context 120. For example, the threshold can represent a level of trust between parties that allow sharing information, such as emotion. The closer in relationship, the higher the trust and the greater the sharing of information from the context 120. A speaker X may indicated that those within a first group are permitted to see emotion as determined by the smartwatch, and others not in the first group are only permitted to see the identity of speaker X.

At 308, the configured processor, in response to the determined social relationship not exceeding the threshold or no authentication, returns an authentication result 132 that includes an indicator of authentication or no authentication. For example, with the authenticated speaker X speaking to authenticated speaker Y, who is not within the group of X authorized to receive information from the context 120 of X, speaker Y receives only the identity of speaker X. In another example, where speaker Y is not authenticated, authenticated speaker X receives only a message that speaker Y is not authenticated, and speaker Y receives only the identity of speaker X.

At 310, the configured processor, in response to the determined social relationship equal to or exceeding the threshold, the authentication result 132 includes information from the context 120. For example, the emotion as determined according to the biometric sensor 110 of the smartwatch 154W and included in the authentication is returned as a displayed message on the smartwatch 154X, such as "X is happy". In another example, the location context and emotion are returned in a message, such as "X is located in the office and X is happy".

At 312, the configured processor decides whether to continue authentication. The decision can include whether the authentication is continuous or transactional, such as verification that voice communication continues. The decision can include a number of attempts at authentication and/or the number of retries remaining in the event of no authentication.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising executing on a computer processor the steps of:

receiving speech and context for the speech of a speaker, wherein the speech is received as electronic voice communication, wherein the context for the speech comprises biometric information and contextual data that is selected from a group consisting of: a locational context comprising an indicator based on a current global positioning satellite location of the speaker, an environmental background noise context of the current location of the speaker, and a social context comprising an identity of another speaker that is in the presence of the speaker at the current location of the speaker, wherein the environmental background noise context is a conversational noise level or a level of background street sounds, wherein the biometric information is measured from physiological signals obtained directly from the speaker via biometric sensors during the received speech, and wherein the physiological signals obtained directly from the speaker during the speech of the speaker is selected from the group consisting of: speaker temperature, speaker heart rate, and speaker blood pressure values;

authenticating an identity of the speaker to the received speech and the context by a speech with context model in response to a three-factor authentication comprised of matching the received speech to a previous recorded speech by the speaker, and matching the biometric information and the contextual data to previous biometric information and contextual data obtained during a recording of the previous recorded speech, wherein the previous biometric information is measured from physiological signals obtained directly from the speaker via biometric sensors during a recording of the previous recorded speech, and wherein the physiological signals obtained from the speaker during the previously recorded speech is selected from the group consisting of: speaker temperature, speaker heart rate, and speaker blood pressure values; and returning a result of the authentication.

2. The method of claim 1, wherein the biometric information includes a value indicative of an emotion of the speaker during the received speech.

3. The method of claim 1, wherein authenticating includes:

identifying an emotion from the received speech;

matching the received speech with previous speech and the identified emotion from the received speech with an emotion from the context of the received speech.

4. The method of claim 1, further including:

determining a social relationship between the speaker and the another speaker as at least one of a co-worker, a manager, a family member and a friend;

wherein returning the result of authentication comprises returning information from the context in response to the determined social relationship exceeding a predetermined threshold value.

5. The method of claim 1, further comprising:

integrating computer-readable program code into a computer system comprising a processor, a computer readable memory in circuit communication with the processor, and a computer-readable storage medium in circuit communication with the processor; and wherein the processor executes program code instructions stored on the computer readable storage medium via the computer readable memory and thereby performs the steps of receiving the speech and context for the speech of the speaker, authenticating the speaker according to the received speech and the context, and returning the result of the authentication.

6. The method of claim 5, wherein the computer-readable program code is provided as a service in a cloud environment.

7. A system, comprising:

a processor;

a computer readable memory in circuit communication with the processor; and a computer readable storage medium in circuit communication with the processor;

wherein the processor executes program instructions stored on the computer-readable storage medium via the computer readable memory and thereby:

receives speech and context for the speech of a speaker, wherein the speech is received as electronic voice communication, wherein the context for the speech comprises biometric information and contextual data that is selected from a group consisting of: a locational context comprising an indicator based on a current global positioning satellite location of the speaker, an environmental background noise context of the current location of the speaker, and a social context comprising an identity of another speaker in the presence of the speaker at the current location of the speaker, wherein the environmental background noise context is a conversational noise level or a level of background street sounds, wherein the biometric information is measured from physiological signals obtained directly from the speaker via biometric sensors during the received speech, and wherein the physiological signals obtained directly from the speaker during the speech of the speaker is selected from the group consisting of: speaker temperature, speaker heart rate, and speaker blood pressure values;

authenticates an identity of the speaker according to the received speech and the context by a speech with context model in response to a three-factor authentication comprised of matching the received speech to a previous recorded speech by the speaker, and matching the biometric information and the contextual data to previous biometric information and contextual data obtained during a recording of the previous recorded speech, wherein the previous biometric information is measured from physiological signals obtained directly from the speaker via biometric sensors during a recording of the previous recorded speech, wherein the physiological signals obtained from the speaker during the previous recorded speech is selected from the group consisting of speaker temperature, speaker heart rate, and speaker blood pressure values; and returns a result of the authentication.

8. The system of claim 7, wherein the biometric information includes a value indicative of an emotion of the speaker during the received speech.

9. The system of claim 7, wherein the processor executes program instructions stored on the computer-readable storage medium via the computer readable memory and thereby:

identify an emotion from the received speech;

match the received speech with previous speech and the identified emotion from the received speech with an emotion from the context of the received speech.

10. The system of claim 7, wherein the processor executes program instructions stored on the computer-readable storage medium via the computer readable memory and thereby:

determine a social relationship between the speaker and the another speaker as at least one of a co-worker, a manager, a family member and a friend;

wherein the returned result of authentication comprises returned information from the context in response to the determined social relationship exceeding a predetermined threshold value.

11. A computer program product, comprising:

a computer readable storage medium having computer readable program code embodied therewith, wherein the computer readable storage medium is not a transitory signal per se, the computer readable program code comprising instructions for execution by a processor that cause the processor to:

receive speech and context for the speech of a speaker, wherein the speech is received as electronic voice communication, wherein the context for the speech comprises biometric information and contextual data that is selected from a group consisting of: a locational context comprising an indicator based on a current global positioning satellite location of the speaker, an environmental background noise context of the current location of the speaker, and a social context comprising an identity of another speaker that is in the presence of the speaker at the current location of the speaker, wherein the environmental background noise context is a conversational noise level or a level of background street sounds, wherein the biometric information is measured from physiological signals obtained directly from the speaker via biometric sensors during the received speech, and wherein the physiological signals obtained directly from the speaker during the speech of the speaker is selected from the group consisting of: speaker temperature, speaker heart rate, and speaker blood pressure values;

authenticate an identity of the speaker to the received speech and the context by a speech with context model in response to a three-factor authentication comprised of matching the received speech to a previous recorded speech by the speaker, and matching the biometric information and the contextual data to previous biometric information and contextual data obtained during a recording of the previous recorded speech, wherein the previous biometric information is measured from physiological signals obtained directly from the speaker via biometric sensors during a recording of the previous recorded speech, and wherein the physiological signals obtained from the speaker during the previous recorded speech is selected from the group consisting of: speaker temperature, speaker heart rate, and speaker blood pressure values; and return a result of the authentication.

12. The computer program product of claim 11, wherein the biometric information includes a value indicative of an emotion of the speaker during the received speech.

13. The computer program product of claim 11, wherein the instructions for execution cause the processor to:

identify an emotion from the received speech;

match the received speech with previous speech and the identified emotion from the received speech with an emotion from the context of the received speech.

14. The computer program product of claim 11, wherein the instructions for execution cause the processor to:

determine a social relationship between the speaker and the another speaker as at least one of a co-worker, a manager, a family member and a friend;

wherein the returned result of authentication comprises returned information from the context in response to the determined social relationship exceeding a predetermined threshold value.

* * * * *